Feb. 28, 1928.
C. G. JOHNSON
1,660,335
SNAP THREAD GAUGE
Original Filed Aug. 20, 1920
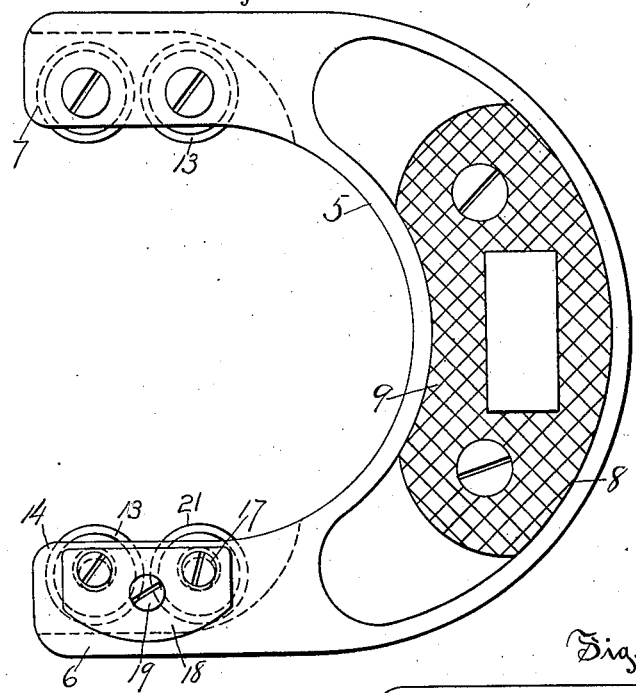
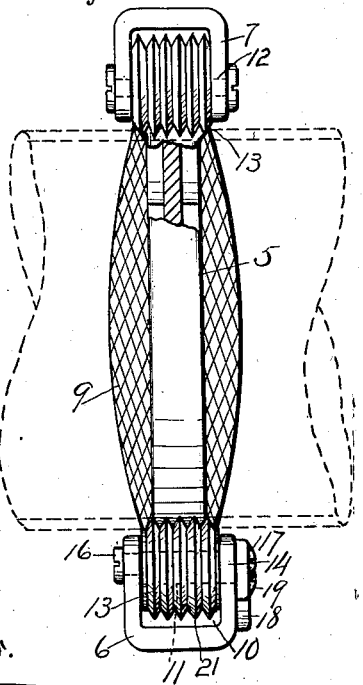
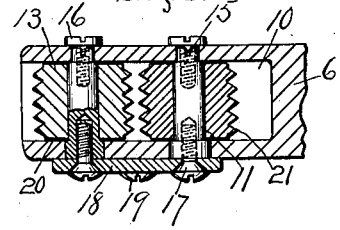
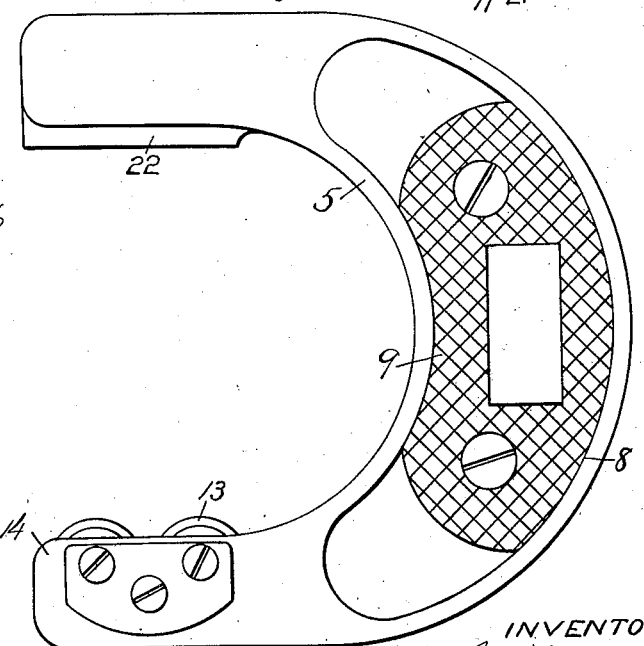
INVENTOR:
Charles G. Johnson.
BY
Arthur S. Jenkins, ATTORNEY.

Patented Feb. 28, 1928.

1,660,335

UNITED STATES PATENT OFFICE.

CHARLES G. JOHNSON, OF HARTFORD, CONNECTICUT.

SNAP THREAD GAUGE.

Application filed August 20, 1920, Serial No. 404,791. Renewed October 6, 1925.

My invention relates to the class of devices more especially used for gauging threads, for determining cross sectional dimensions, &c., and an object of my invention, among others, is to provide a device of this class that shall be simple in construction and particularly effective in operation, and with a minimum depreciation in accuracy through wear.

One form of gauge embodying my invention and in the construction and use of which the objects herein set out, as well as others, may be attained, is illustrated in the accompanying drawings, in which—

Figure 1 is a face view of my improved gauge.

Figure 2 is an end view of the same, showing its application.

Figure 3 is a view in lengthwise section through one of the branches of said gauge.

Figure 4 is a view illustrating the gauge in a little different form.

In the accompanying drawings the numeral 5 indicates the body or stock of my improved gauge that is preferably of U-shape and having branches 6—7 that serve as supports for the gauging devices. The stock preferably has recesses 8 to receive grips 9 that may be made of rubber or any other suitable material.

The branches 6—7 have at their ends supporting side parts preferably formed by grooves 10 on the inside edge of each branch, and bearing pins 11—12 for gauging rollers 13 are mounted in the side parts 14 of said branches, said pins being so arranged that the distance between oppositely disposed rollers in the branches may be varied for the purpose of gauging parts of different dimensions.

In the form of construction as herein shown the pins 11 having their ends supported in the branches 6 are eccentric pins, but it will be obvious that all of the pins for supporting the gauging rolls may be of this construction if desired. Each end of each pin 11 has a bearing in one of the side parts 14, the ends of each pin constituting its bearing in the side parts being eccentric to the body or main part that supports a gauging roller. One end of each eccentric pin has a slot 15 by means of which the pin may be turned, as with a screw driver, and this end of each pin has a threaded opening to receive a retaining screw 16. The opposite end of each pin has an opening also threaded to receive a clamping screw 17 that is preferably beveled on the under side of its head, said clamping screws passing through a clamping plate 18 that is held in place as by means of a holding screw 19 extending through the plate and into the branch that supports it.

In the operation of securing the eccentric pins when the proper adjustments thereof have been secured, the clamping screws are turned to draw the ends of the pins up snugly against the clamping plate, the beveled under sides of the heads of the screws aiding in this clamping operation.

The rollers 13 are rotatably mounted on the eccentric pins, there being two sets of said rollers, the members of each set of which are located opposite each other in the branches 6—7. These rollers are provided with annular ribs 21 extending circumferentially around their outer surfaces, that is, such ribs extend in the shortest direction around the rollers and are not inclined as is the thread of a screw. This formation of the ribs provides the rollers with corresponding grooves between them all formed in shape and size to correspond with the threads to be measured, and while, in the structure herein shown, these ribs may correspond in number to the threads to be measured and are round in form, yet such lesser number and form of ribs on the gauging rollers may be employed as may be desired. It will be noted that the ribs on the rollers of one of the branches are staggered with respect to the ribs of the roller on the other branch, as shown in Figure 2 of the drawings, altho I do not limit the invention of this precise arrangement, and by the term "staggered" as employed herein, I mean that a rib on one roller is located opposite the space between two adjacent ribs on the opposite roller, that is, the crowns of the ribs on one roller are not directly opposite the crowns of the ribs on the opposite roller.

In forming an article to a certain size it is common practice at the present time to allow a certain range within which the measurements must fall, this range often being somewhat less than 2/1000th inch in the case of a screw thread, therefore, I provide two sets of rollers, the first set, that is the set first making contact with the piece being measured, being adjusted to the higher limit of the range, and that set further back being adjusted to the other limit of the range. The article to be gauged will pass through between the first set of rollers but will not pass through the second set of rollers, if it conforms to the required size. If it will not pass through the first set of rollers it is not small enough, and if it will pass between the second set of rollers it will be too small to satisfy requirements. It will thus be seen that by use of the two sets of rollers the required size of a piece of work may be readily determined.

The device as illustrated in Figure 4 is for the purpose of gauging an article other than a screw threaded one and for this purpose one of the branches of the gauge is provided with an anvil 22 that is flat on its working surface, which working surface is located opposite the gauging rollers in the other branch of the gauge, the operation of gauging an article, however, being the same as hereinabove described.

The gauge rollers are of a length a trifle shorter than the distance between the side parts 14, a very slight space consequently existing between the ends of the rollers and side parts, and as shown in the drawings herein, the showing of such space 20 however being necessarily exaggerated as it will be so slight as to be practically impossible of a showing in this way, the difference between the length of the rollers and the distance between the side parts being approximately 5/1,000th part of an inch. This provision of a slight play for the rollers permits them to align themselves with respect to the threads on the piece being gauged and thereby avoid any cramping of the parts in the gauging operation.

While a considerable portion of the novelty of my invention herein resides in providing a thread gauge having rolls formed with annular thread engaging ribs therearound, it should be clearly understood that the scope of my invention is not limited to this particular construction. In the drawing and specification I have particularly illustrated and described my invention in connection with such a thread gauge (Figs. 1-3) and a gauge for gauging non-threaded parts (Fig. 4). In accordance with the broader scope of my invention however it should be understood that the gauge rolls may be plain or provided with gauging surfaces of any desired configuration to perform the gauging function.

The gauging members or rollers 13 being round, when the threaded article being gauged makes contact with them, this contact will be with a minimum portion of the surface of both said article and the rollers and along a line extending crosswise of the thread, thereby providing a line contact between the rollers and the article being gauged.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A snap gauge comprising a stock having opposed branches, a roller mounted for rotation about its central axis in one of said branches, an opposed gauging member on the other branch, and means for adjusting the roller bodily in its branch toward and from the other branch, the said roller being free to rotate in the gauging operation.

2. A snap gauge comprising a stock having opposed branches, a roller mounted for rotation about its central axis in each of the said branches, and means for adjusting one of the rollers bodily in its branch toward and from the other roller, the rollers being free to rotate in the gauging operation.

3. A limit gauge comprising a stock having opposed branches, a pair of rollers mounted for rotation about their central axes in one of said branches, a pair of opposed gauging rollers rotatably mounted in the other branch, and means for bodily adjusting the rollers in one branch toward and from the rollers in the other branch, the rollers being free to rotate in the gauging operation.

4. A gauge comprising a stock having branches, a roller rotatably mounted in one of said branches and having a central axis and a plurality of thread engaging surfaces arranged to fit a thread to be gauged, an opposing gauging member located on the other branch, and means for adjusting the axis of said roller in its branch toward and from the other branch.

5. A gauge comprising a stock having branches, a pin mounted in one of said branches and having an eccentric portion, a roller mounted on the eccentric portion of said pin whereby its axis may be moved toward and from the other branch by rotating the pin, and an opposing gauging member located upon said other branch of the stock.

6. A gauge comprising a stock having branches, a pin rotatably mounted in one of said branches, a roller mounted upon the eccentric portion of said pin and having its periphery formed to engage a thread to be gauged, a clamp plate secured to said branch, means upon the clamp plate to draw the end of the eccentric pin into contact therewith to hold it against movement, and an opposing gauging member located upon the other branch of said stock.

7. A thread gauge comprising a stock having opposed branches, a pair of rollers mounted for rotation about their central axes in one of said branches and having a plurality of annular thread engaging surfaces arranged to fit a thread to be gauged, opposed gauging means on the other branch provided with cooperating thread engaging surfaces, and means providing a relative adjustment between the said gauging means and the axis of the rollers.

8. A gauge comprising a stock having branches, a roller mounted for rotation about its central axis in each branch and having a plurality of thread engaging edges to engage a thread to be gauged, a second set of rollers mounted for rotation about their central axes located one in each branch and back of the first mentioned set of rollers, the latter set of rollers each having a plurality of thread engaging surfaces, and means for bodily adjusting the rollers of one branch toward and from the other branch.

9. A snap thread gauge comprising a stock having opposed branches, a roller mounted for rotation about its central axis in one of said branches and provided with a plurality of annular thread engaging surfaces extending circumferentially about its periphery, an opposed gauging member on the other branch provided with cooperating thread engaging surfaces, and means providing a relative adjustment between the roller and member toward and from each other, the roller being free to rotate in the gauging operation.

10. A snap thread gauge comprising a stock having opposed branches, a roller mounted for rotation about its central axis in one of said branches and provided with a plurality of annular thread engaging surfaces extending circumferentially about its periphery, an opposed gauging member on the other branch provided with cooperating thread engaging surfaces, and means for adjusting the roller toward and from the said member, the said roller being free to rotate in the gauging operation.

11. A snap thread gauge comprising a stock having opposed branches, a thread gauging member provided with a plurality of annular thread engaging surfaces extending circumferentially about its periphery, a pin for supporting the roller, means eccentric of the pin and cooperating therewith to support the roller on one of the branches, rotation of the said means being adapted to adjust the roller toward and from the other branch, and an opposed gauging member on the other branch provided with cooperating thread engaging surfaces.

12. A snap thread gauge comprising a stock having opposed branches, a pair of opposed rollers mounted at their central axes respectively in the said branches, each of such rollers being provided with a plurality of annular thread engaging surfaces extending circumferentially about its periphery and the apexes of the said surfaces of one roller being staggered with respect to those of the opposed roller, and means providing a relative adjustment between the axes of the rollers toward and from each other, the rollers being free to rotate in the gauging operation.

13. A substantially U-shaped limit thread snap gauge comprising a stock having opposed branches, a pair of rollers mounted for rotation about their central axes in one of said branches, a pair of opposed gauging rollers mounted for rotation about their central axes in the other branch, each of the said rollers being provided with a plurality of annular thread engaging surfaces extending circumferentially about its periphery and the apexes of the said surfaces of the rollers in one branch being staggered with respect to those of the rollers in the other branch, and means for bodily adjusting the rollers of one branch toward and from the rollers of the other branch, the rollers being free to rotate in the gauging operation.

14. A thread gauge comprising a stock having branches, a gauging member having its periphery grooved to engage a thread to be gauged, a pin for supporting the roller, means eccentric of the pin and cooperating therewith to support the roller on one of the branches, rotation of the said means being adapted to adjust the roller toward and from the other branch, means for securing the first said means against rotation, and an opposing gauging member located in the other branch of the stock.

15. A snap thread gauge comprising a stock having opposed branches, a roller mounted for rotation about its central axis in one of said branches, said roller being provided with a plurality of annular ribs extending circumferentially about its periphery to conform to the thread being gauged as to pitch, lead and form, and means upon the other branch corresponding to said ribs to receive the thread to be gauged, said means being staggered with respect to the ribs on the roller in the opposite branch.

16. A snap thread gauge comprising a stock having opposed branches, a roller mounted for rotation about its central axis in one of said branches, an opposed roller mounted for rotation about its central axis in the other branch, each of said rollers being provided with a plurality of annular ribs extending circumferentially about its periphery which conform to the thread to be gauged with respect to pitch, lead and form, and the apexes of said ribs of one roller being staggered with respect to those of the roller in the other branch, the rollers being free to rotate in the gauging operation.

17. A thread snap gauge comprising a stock having opposed branches, a pin, a gauging member having beveled thread engaging ribs extending around its periphery and having a round central opening within which the pin engages to mount the member thereon, means rotatably mounted in one of the branches and supporting the pin in a relatively eccentric position, the pin and member being adjusted toward and from the other branch by rotatably adjusting the said means, and an opposed gauging member on the other branch provided with a thread engaging rib or ribs to cooperate with the ribs on the first said member in gauging a thread.

18. A gauge comprising a stock, gauging members oppositely arranged in the stock to receive a threaded device to be gauged between them, one of said members being rotatably mounted in the stock and having a peripheral rib with its entire crown located in a plane at right angles to the axis of said member, whereby devices having threads of of different helix angles may be gauged by a line contact between said peripheral rib and said threads and means eccentrically supported in said stock and upon which one of said members is rotatably mounted.

19. A gauge comprising a stock having opposed branches, a gauging roller, a pin on which the roller is mounted, means rotatably mounted in one of the branches and supporting the pin in a relatively eccentric position, the pin and roller being adjusted toward and from the other branch by rotatably adjusting the said means, and an opposing gauging member located on the other branch.

20. A gauge comprising a stock having opposed branches, a gauging roller, a pin for supporting the roller, means eccentric of the pin and cooperating therewith to support the roller on one of the branches, rotation of the said means being adapted to adjust the roller toward and from the other branch, and an opposing gauging member located on the other branch.

CHARLES G. JOHNSON.